US012718979B2

(12) United States Patent
Lee et al.

(10) Patent No.: US 12,718,979 B2
(45) Date of Patent: Aug. 25, 2026

(54) COIL COMPONENT

(71) Applicant: SAMSUNG ELECTRO-MECHANICS CO., LTD., Suwon-si (KR)

(72) Inventors: Jong Wook Lee, Suwon-si (KR); Hyung Sang Jeon, Suwon-si (KR); Hyun Ju Yu, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 966 days.

(21) Appl. No.: 17/875,980

(22) Filed: Jul. 28, 2022

(65) Prior Publication Data

US 2023/0054193 A1 Feb. 23, 2023

(30) Foreign Application Priority Data

Aug. 19, 2021 (KR) ........................ 10-2021-0109540

(51) Int. Cl.
*H01F 5/00* (2006.01)
*H01F 27/29* (2006.01)
*H01F 27/32* (2006.01)

(52) U.S. Cl.
CPC ............. *H01F 27/32* (2013.01); *H01F 27/29* (2013.01)

(58) Field of Classification Search
CPC ........................................................ H01F 27/32
USPC .......................................................... 336/200
See application file for complete search history.

(56) References Cited

U.S. PATENT DOCUMENTS

2015/0016014 A1 1/2015 Park et al.
2016/0351314 A1* 12/2016 Jeong .................. H01F 17/0013
2017/0345556 A1 11/2017 Kim et al.
2018/0308630 A1* 10/2018 Shinohara ............... H01F 27/29
(Continued)

FOREIGN PATENT DOCUMENTS

KR 10-2015-0007581 A 1/2015
KR 10-2017-0133140 A 12/2017
KR 10-2019-0096679 A 8/2019
(Continued)

OTHER PUBLICATIONS

Office Action issued on Nov. 1, 2025 in the corresponding Korean Patent Application No. 10-2021-0109540 with English translation.

*Primary Examiner* — Ronald Hinson
(74) *Attorney, Agent, or Firm* — Morgan, Lewis & Bockius LLP

(57) ABSTRACT

A coil component includes: a body having a first surface and a second surface opposing each other, and a first end surface and a second end surface connecting the first surface and the second surface to each other and opposing each other in a first direction; a coil unit disposed in the body; and first and second external electrodes disposed on the body, and respectively connected to the coil unit, wherein the coil component includes a slit portion formed in at least one of the first surface of the body and the second surface of the body, spaced apart from each of the first and second external electrodes, and extending in a direction intersecting the first direction, and a dimension $W_s$ of the slit portion in the first direction is less than or equal to 20.8% of a dimension $L_c$ of the coil component in the first direction.

16 Claims, 8 Drawing Sheets

(56) References Cited

U.S. PATENT DOCUMENTS

| | | | |
|---|---|---|---|
| 2019/0252113 | A1 | 8/2019 | Ku et al. |
| 2019/0311829 | A1 | 10/2019 | Kang et al. |

FOREIGN PATENT DOCUMENTS

| | | | |
|---|---|---|---|
| KR | 10-2016499 | B1 | 9/2019 |
| KR | 10-2171676 | B1 | 10/2020 |

* cited by examiner

COIL COMPONENT

CROSS-REFERENCE TO RELATED APPLICATION(S)

This application claims the benefit of priority to Korean Patent Application No. 10-2021-0109540 filed on Aug. 19, 2021 in the Korean Intellectual Property Office, the disclosure of which is incorporated herein by reference in its entirety.

TECHNICAL FIELD

The present disclosure relates to a coil component.

BACKGROUND

An inductor, a coil component, is a representative passive electronic component used in an electronic device together with a resistor and a capacitor.

As the electronic device implements high-performance and has a smaller size, the electronic component used in the electronic device may have increased numbers and a smaller size.

Meanwhile, there may occur leakage current flowing along a surface of a body rather than a coil when voltage is applied to the coil component.

An aspect of the present disclosure may provide a coil component which may reduce leakage current flowing along a surface of a body.

SUMMARY

An aspect of the present disclosure may provide a coil component which may reduce leakage current flowing along a surface of a body.

According to an aspect of the present disclosure, a coil component may include: a body having a first surface and a second surface opposing each other, and a first end surface and a second end surface connecting the first surface and the second surface to each other and opposing each other in a first direction; a coil unit disposed in the body; and first and second external electrodes disposed on the body while being spaced apart from each other, and respectively connected to the coil unit, wherein the coil component includes a slit portion formed in at least one of the first surface of the body and the second surface of the body, spaced apart from each of the first and second external electrodes, and extending in a direction intersecting the first direction, and a dimension $W_s$ of the slit portion in the first direction is less than or equal to 20.8% of a dimension $L_c$ of the coil component in the first direction.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
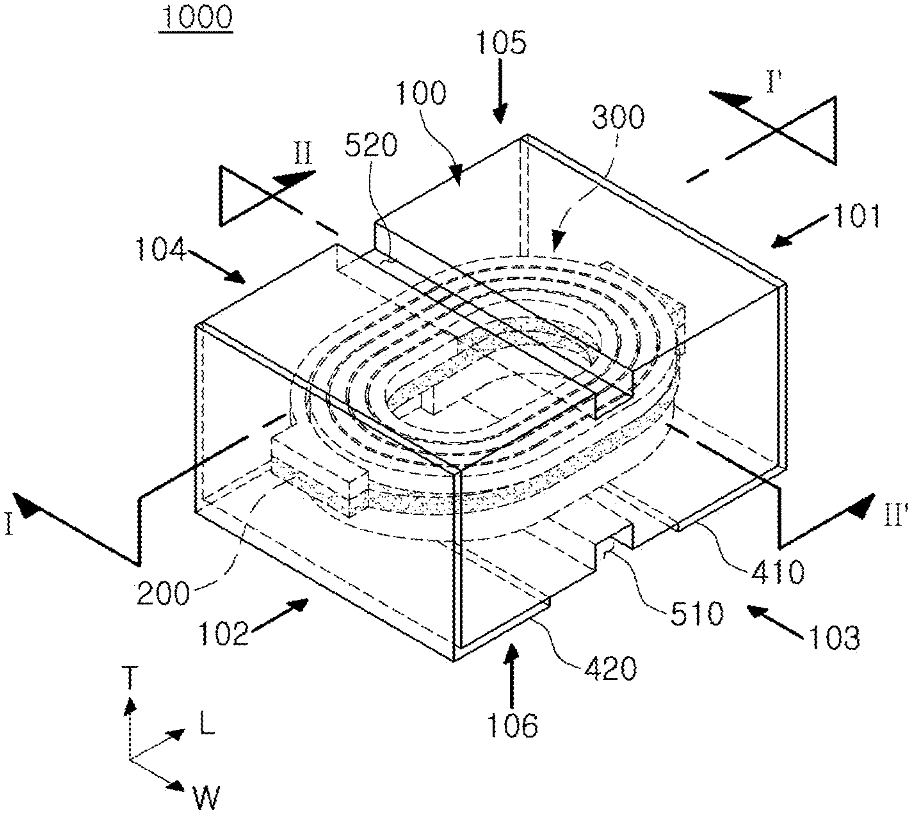
FIG. 1 is a perspective view schematically showing a coil component according to a first exemplary embodiment of the present disclosure.

Hereinafter, exemplary embodiments in the present disclosure will now be described in detail with reference to the accompanying drawings.

In the drawings, an L direction refers to a first direction or a length direction, a W direction refers to a second direction or a width direction, and a T direction refers to a third direction or a thickness direction.

Hereinafter, a coil component according to exemplary embodiments of the present disclosure will be described in detail with reference to the accompanying drawings. In describing exemplary embodiments of the present disclosure with reference to the accompanying drawings, components that are the same as or correspond to each other will be denoted by the same reference numerals, and an overlapping description thereof will be omitted.

Various kinds of electronic components may be used in an electronic device, and various kinds of coil components may be appropriately used between these electronic components depending on their purposes in order to remove noise or the like.

That is, the coil component used in the electronic device may be a power inductor, high frequency (HF) inductor, a general bead, a bead for a high frequency (GHz), a common mode filter or the like.

First Exemplary Embodiment

Figure 2:
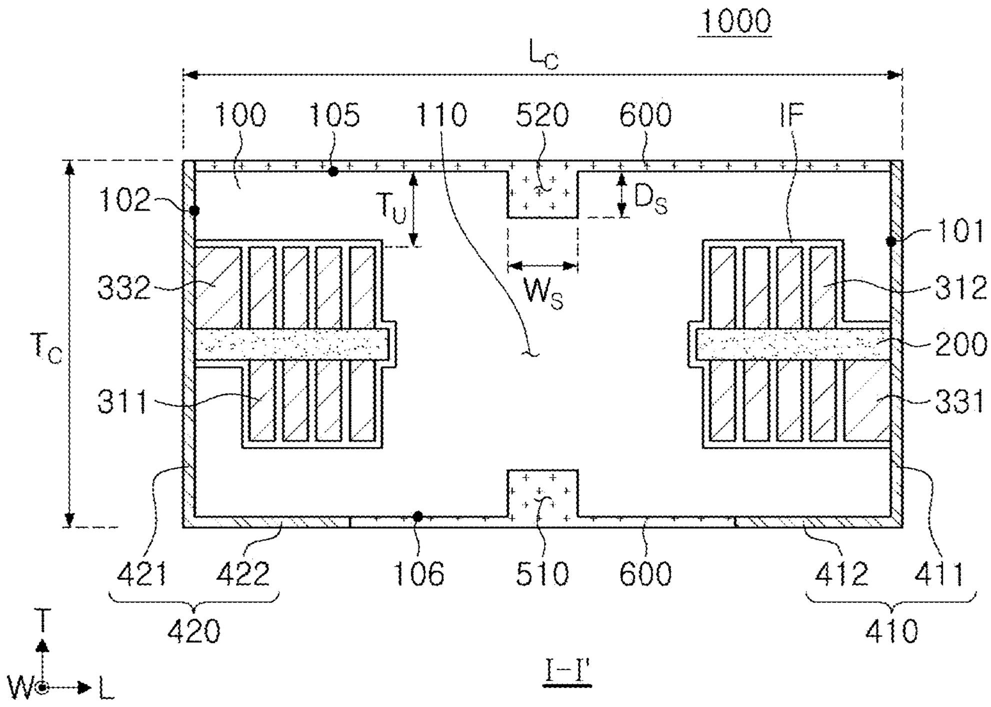
FIG. 2 is a cross-sectional view taken along line I-I' of FIG. 1.

FIG. 1 is a perspective view schematically showing a coil component 1000 according to a first exemplary embodiment of the present disclosure; FIG. 2 is a cross-sectional view taken along line I-I' of FIG. 1; and FIG. 3 is a cross-sectional view taken along line II-II' of FIG. 1.

Meanwhile, FIG. 1 omits an external insulating layer 600 used in the present exemplary embodiment in order to more clearly show a coupling between other components.

Figure 3:
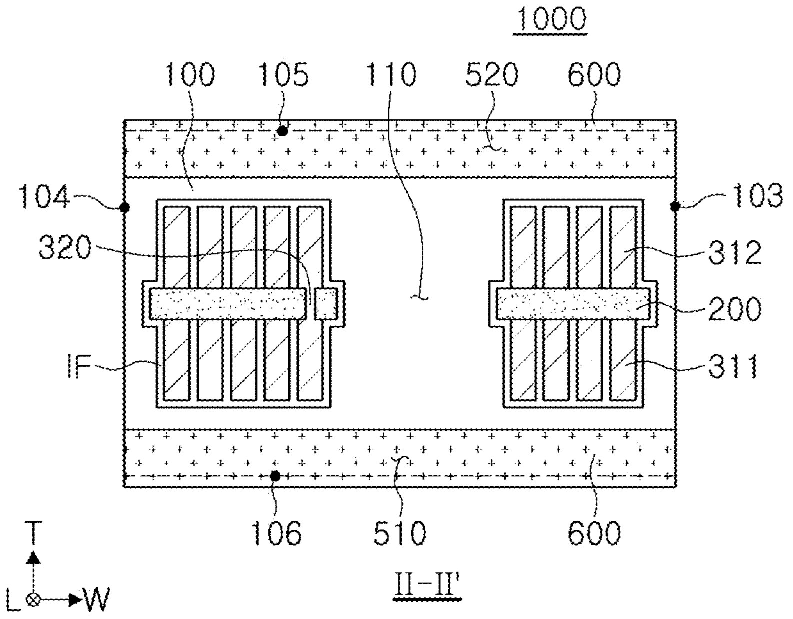
FIG. 3 is a cross-sectional view taken along line II-II' of FIG. 1.

Referring to FIG. 1 through 3, the coil component 1000 according to an exemplary embodiment of the present disclosure may include a body 100, a substrate 200, a coil unit 300, external electrodes 410 and 420, slit portions 510 and 520 and the external insulating layer 600, and further include an insulating film IF.

The body 100 may form an appearance of the coil component 1000 according to this exemplary embodiment, and the coil unit 300 and the substrate 200 may be disposed in the body.

The body 100 may generally have a hexahedral shape.

The body 100 may have a first surface 101 and a second surface 102 opposing each other in the length (L) direction, a third surface 103 and a fourth surface 104 opposing each other in the width (W) direction, and a fifth surface 105 and a sixth surface 106 opposing each other in the thickness (T) direction, based on a direction shown in FIGS. 1 and 3. Each of the first to fourth surfaces 101, 102, 103 and 104 of the body 100 may correspond to a wall surface of the body 100, connecting the fifth surface 105 and the sixth surface 106 of the body 100 to each other, Hereinafter, both end surfaces (i.e., a first end surface and a second end surface) of the body 100 may refer to the first and second surfaces 101 and 102 of the body, both side surfaces (i.e., first and second side surfaces) of the body 100 may refer to the third and fourth surfaces 103 and 104 of body, and first and second surfaces of the body 100 may refer to the sixth and the fifth surface 106 and 105 of the body, respectively. The sixth surface 106 of the body 100 may be used as a mounting surface when the coil component 1000 according to this exemplary embodiment is mounted on an insulation substrate such as a printed circuit board (PCB).

The body 100 may include, for example, the coil component 1000 according to this exemplary embodiment. The coil component 1000 may include the external electrodes 410 and 420 and the external insulating layer 600, described below, and have a length of 2.5 mm, a width of 2.0 mm and a thickness of 1.0 mm, a length of 2.0 mm, a width of 1.2 mm and a thickness of 0.65 mm, a length of 1.6 mm, a width of 0.8 mm and a thickness of 0.8 mm, a length of 1.0 mm, a width of 0.5 mm and a thickness of 0.5 mm or a length of 0, 8 mm, a width of 0.4 mm and a thickness of 0.65 mm. However, the present disclosure is not limited thereto. Meanwhile, the above numerical value may only be a numerical value based on a design not reflecting a process error or the like therein, and a range of the numerical value recognized to include the process error may fall within a scope of the present disclosure.

The above length of the coil component 1000 may have a maximum value of respective dimensions of a plurality of line segments connecting two outermost boundary lines of the coil component 1000 shown in a cross-sectional image, opposing each other in the length (L) direction, and parallel to the length (L) direction, in which the cross-sectional image is an image of a length-thickness (LT) cross section of the coil component 1000 based on its center in the width (W) direction, obtained using an optical microscope or a scanning electron microscope (SEM). Alternatively, the above length of the coil component 1000 may have a minimum value of the respective dimensions of the plurality of line segments connecting the two outermost boundary lines of the coil component 1000 shown in the cross-sectional image, opposing each other in the length (L) direction, and parallel to the length (L) direction. Alternatively, the above length of the coil component 1000 may have at least three arithmetic average values of the respective dimensions of the plurality of line segments connecting the two outermost boundary lines of the coil component 1000 shown in the cross-sectional image, opposing each other in the length (L) direction, and parallel to the length (L) direction. Here, the plurality of line segments parallel to the length (L) direction may be equally spaced from each other in the thickness (T) direction, and the scope of the present disclosure is not limited thereto. Other measurement methods and/or tools appreciated by one of ordinary skill in the art, even if not described in the present disclosure, may also be used.

The above thickness of the coil component 1000 may have a maximum value of respective dimensions of a plurality of line segments connecting two outermost boundary lines of the coil component 1000 shown in the cross-sectional image, opposing each other in the thickness (T) direction, and parallel to the thickness (T) direction, in which the cross-sectional image may be the image of the length-thickness (LT) cross section of the coil component 1000 based on its center in the width (W) direction, obtained using the optical microscope or the scanning electron microscope (SEM). Alternatively, the above thickness of the coil component 1000 may have a minimum value of the respective dimensions of the plurality of line segments connecting the two outermost boundary lines of the coil component 1000 shown in the cross-sectional image, opposing each other in the thickness (T) direction, and parallel to the thickness (T) direction. Alternatively, the above thickness of the coil component 1000 may have at least three arithmetic average values of the respective dimensions of the plurality of line segments connecting the two outermost boundary lines of the coil component 1000 shown in the cross-sectional image, opposing each other in the thickness (T) direction, and parallel to the thickness (T) direction. Here, the plurality of line segments parallel to the thickness (T) direction may be equally spaced from each other in the length (L) direction, and the scope of the present disclosure is not limited thereto. Other measurement methods and/or tools appreciated by one of ordinary skill in the art, even if not described in the present disclosure, may also be used.

The above width of the coil component 1000 may have a maximum value of respective dimensions of a plurality of line segments connecting two outermost boundary lines of the coil component 1000 shown in the cross-sectional image, opposing each other in the width (W) direction, and parallel to the width (W) direction, in which the cross-sectional image may be the image of the length-thickness (LT) cross section of the coil component 1000 based on its center in the width (W) direction, obtained using the optical microscope or the scanning electron microscope (SEM). Alternatively, the above width of the coil component 1000 may have a minimum value of the respective dimensions of the plurality of line segments connecting the two outermost boundary lines of the coil component 1000 shown in the cross-sectional image, opposing each other in the width (W) direction, and parallel to the width (W) direction. Alternatively, the above width of the coil component 1000 may have at least three arithmetic average values of the respective dimensions of the plurality of line segments connecting the two outermost boundary lines of the coil component 1000 shown in the cross-sectional image, opposing each other in the width (W) direction, and parallel to the width (W) direction. Here, the plurality of line segments parallel to the width (W) direction may be equally spaced from each other in the length (L) direction, and the scope of the present disclosure is not limited thereto, Other measurement methods and/or tools appreciated by one of ordinary skill in the art, even if not described in the present disclosure, may also be used.

Alternatively, each of the length, width and thickness of the coil component 1000 may be measured by using a micrometer measurement method. The micrometer measurement method may be used by setting a zero point with a micrometer using a repeatability and reproducibility (Gage R&R), inserting the coil component 1000 according to this exemplary embodiment between tips of the micrometer, and turning a measurement lever of the micrometer. Meanwhile, when measuring the length of the coil component 1000 by using the micrometer measurement method, the length of the coil component 1000 may indicate a value measured once or an arithmetic average of values measured a plurality of times. This manner may be equally applied to the width and thickness of the coil component 1000.

The body 100 may include a magnetic material. In detail, the body 100 may be formed by stacking one or more magnetic composite sheets in which the magnetic materials are dispersed in an insulating resin. The magnetic material may be ferrite or metal magnetic powder particles.

The ferrite powder particles may include, for example, at least one of a spinel type ferrite such as Mg—Zn-based ferrite, Mn—Zn-based ferrite, Mn—Mg-based ferrite, Cu—Zn-based ferrite, Mg—Mn—Sr-based ferrite or Ni—Zn-based ferrite; a hexagonal type ferrite such as Ba—Zn-based ferrite, Ba—Mg-based ferrite, Ba—Ni-based ferrite, Ba—Co-based ferrite or Ba—Ni—Co-based ferrite; and a garnet type ferrite such as Y-based ferrite or Li-based ferrite.

The metal magnetic powder particles may include one or more selected from the group consisting of iron (Fe), silicon (Si), chromium (Cr), cobalt (Co), molybdenum (Mo), aluminum (Al), niobium (Nb), copper (Cu) and nickel (Ni). For example, the metal magnetic powder particles may be one or more of pure iron powder particles, Fe—Si-based alloy powder particles, Fe—Si—Al-based alloy powder particles, Fe—Ni-based alloy powder particles, Fe—Ni—Mo-based alloy powder particles, Fe—Ni—Mo—Cu-based alloy powder particles, Fe—Co-based alloy powder particles, Fe—Ni—Co-based alloy powder particles, Fe—Cr-based alloy powder particles, Fe—Cr—Si-based alloy powder particles, Fe—Si—Cu—Nb-based alloy powder particles, Fe—Ni—Cr-based alloy powder particles and Fe—Cr—Al-based alloy powder particles.

The metal magnetic powder particles may be amorphous ox crystalline. For example, the metal magnetic powder particles may be Fe—Si—B—Cr based amorphous alloy powder particles, and are not necessarily limited thereto.

The ferrite and the metal magnetic powder particles may have average diameters of about 0.1 μm to 30 μm, respectively, and are not limited thereto.

The body 100 may include two or more types of magnetic materials dispersed in the resin. Here, different types of magnetic materials may indicate that the magnetic materials dispersed in the resin are distinguished from each other by any one of an average diameter, a composition, crystallinity and a shape.

Meanwhile, the following description is made on a premise that the magnetic material is formed of magnetic metal powder particles. However, the scope of the present disclosure is not limited to the body 100 having the magnetic metal powder particles dispersed in the insulating resin.

The insulating resin may include epoxy, polyimide, liquid crystal polymer (LCP) or the like, or a mixture thereof, and is not limited thereto.

The body 100 may include a core 110 penetrating through the substrate 200 and the coil unit 300, described below. The core 110 may be formed by the magnetic composite sheet filling a through hole passing through a center of each of the coil unit 300 and the substrate 200, and is not limited thereto.

The substrate 200 may be disposed in the body 100. The substrate 200 may support the coil unit 300 described below.

The substrate 200 may be formed of an insulating material including a thermosetting insulating resin such as an epoxy resin, a thermoplastic insulating resin such as polyimide or a photosensitive insulating resin, or an insulating material impregnated with a reinforcing material such as glass fiber or inorganic filler in this insulating resin. For example, the substrate 200 may be formed of an insulating material such as prepreg, an Ajinomoto Build-up Film (ABF), FR-4, a bismaleimide triazine (BT) resin, a photo imagable dielectric (PID) or the like, and is not limited thereto.

The inorganic filler may use one or more materials selected from the group consisting of silica (or silicon dioxide, $SiO_2$), alumina (or aluminum oxide, $Al_2O_3$), silicon carbide (Sic), barium sulfate ($BaSO_4$), talc, clay, mica powder particles, aluminum hydroxide ($AlOH_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$) and calcium zirconate ($CaZrO_3$).

When formed of the insulating material including the reinforcing material, the substrate 200 may have higher rigidity. When the substrate 200 is formed of an insulating material that does not include the glass fiber, it is advantageous to reduce the thickness of the coil component 1000 according to this exemplary embodiment. In addition, it is possible to increase a volume of the coil unit 300 and/or the magnetic metal powder particles, based on the body 100 having the same size, thereby improving a characteristic of the coil component. When the substrate 200 is formed of the insulating material including the photosensitive insulating resin, it is possible to reduce the number of processes of forming the coil unit 300, which may be advantageous in reducing a production cost and forming a fine via.

For example, the substrate 200 may have a thickness of 10 μm or more and 50 μm or less, and is not limited thereto.

The coil unit 300 may be disposed in the body 100 and exhibit the characteristic of the coil component 1000. For example, when the coil component 1000 of this exemplary embodiment is used as a power inductor, the coil unit 300 may serve to store an electric field as a magnetic field to maintain an output voltage, thereby stabilizing power of the electronic device.

The coil unit 300 may include coil patterns 311 and 312, a via 320 and lead-out portions 331 and 332. In detail, the first coil pattern 311 and the first lead-out portion 331 may each be disposed on a lower surface of the substrate 200, facing the sixth surface 106 of the body 100, and the second coil pattern 312 and the second lead-out portion 332 may each be disposed on an upper surface of the substrate 200, facing the fifth surface 105 of the body 100, based on the direction of FIGS. 1 through 3.

The via 320 may pass through the substrate 200 to be in contact and connected with an inner end of each of the first coil pattern 311 and the second coil pattern 312. The first and second lead-out portions 331 and 332 may respectively be connected to the first and second coil patterns 311 and 312, respectively exposed to the first and second surfaces 101 and 102 of the body 100, and respectively connected to the first and second external electrodes 410 and 420 described below. In this manner, the coil unit 300 may entirely function as a single coil between the first and second external electrodes 410 and 420.

Each of the first coil pattern 311 and the second coil pattern 312 may have a shape of a flat spiral having at least one turn by using the core 110 as an axis. For example, the first coil pattern 311 may form at least one turn on the lower surface of the substrate 200 by using the core 110 as the axis.

The lead-out portions 331 and 332 may respectively be exposed to the first and second surfaces 101 and 102 of the body 100. In detail, the first lead-out portion 331 may be exposed to the first surface 101 of the body 100, and the second lead-out portion 332 may be exposed to the second surface 102 of the body 100.

At least one of the coil patterns 311 and 312, the via 320 and the lead-out portions 331 and 332 may include at least one conductive layer.

For example, when the second coil pattern 312, the via 320 and the second lead-out portion 332 are formed on the upper surface of the substrate 200 by plating, the second coil pattern 312, the via 320 and the second lead-out portion 332 may each include a seed layer and an electroplating layer. Here, the electroplating layer may have a single-layer or multi-layer structure. The electroplating layer having the multi-layer structure may be a conformal film in which another electroplating layer is formed along a surface of one electroplating layer, or may be a layer in which another electroplating layer is stacked on only one surface of one electroplating layer. The seed layer may be formed by an electroless plating method or a vapor deposition method such as sputtering. The respective seed layers of the second coil pattern 312, the via 320 and the second lead-out portion 332 may be integrally formed with each other to have no boundary formed therebetween, and are not limited thereto. The respective electroplating layers of the second coil pattern 312, the via 320 and the second lead-out portion 332 may be integrated with each other, thus having no boundary formed therebetween, and are not limited thereto.

For another example, the coil unit 300 may be formed by separately forming the first coil pattern 311 and the first lead-out portion 331, disposed on the lower surface of the substrate 200, and the second coil pattern 312 and the second lead-out portion 332, disposed on the upper surface of the substrate 200, from each other, and then collectively laminating the same on the substrate 200. In this case, the via 320 may include a high-melting-point metal layer and a low-melting-point metal layer having a melting point lower than a melting point of the high-melting-point metal layer, Here, the low-melting-point metal layer may be formed of a solder including lead (Pb) and/or tin (Sn). At least a portion of the low-melting-point metal layer may be melted by a pressure and a temperature during the collective lamination. For example, an inter-metallic compound (IMC) layer may be formed at a boundary between the low-melting-point metal layer and the second coil pattern 312.

For example, the coil patterns 311 and 312 and the lead-out portions 331 and 332 may respectively protrude from the lower surface and upper surface of the substrate 200, as shown in FIGS. 2 and 3. For another example, the first coil pattern 311 and the first lead-out portion 331 may protrude from the lower surface of the substrate 200, and the second coil pattern 312 and the second lead-out portion 332 may be embedded in the upper surface of the substrate 200 to allow their upper surfaces to be exposed to the upper surface of the substrate 200. In this case, a recess portion may be formed in the upper surface of the second coil pattern 312 and/or in the upper surface of the second lead-out portion 332, and the upper surface of the substrate 200 and the upper surface of the second coil pattern 312 and/or the upper surface of the second lead-out portion 332 may not be positioned on the same plane.

Each of the coil patterns 311 and 312, the via 320 and the lead-out portions 331 and 332 may be formed of a conductive material such as copper (Cu), aluminum (Al), silver (Ag), tin (Sn), gold (Au), nickel (Ni), lead (Pb), titanium (Ti), chromium (Cr) or an alloy thereof, and is not limited thereto.

The insulating film IF may be disposed between the coil unit 300 and the body 100, and between the substrate 200 and the body 100. The insulating film IF may be formed along the surface of the substrate 200 on which the coil patterns 311 and 312 and the lead-out portions 331 and 332 are formed, and is not limited thereto. The insulating film IF may be used for insulating the coil unit 300 and the body 100 from each other, include a well-known insulating material such as parylene, and is not limited thereto. For another example, the insulating film IF may include the insulating material such as then epoxy resin other than parylene. The insulating film IF may be formed by the vapor deposition, and is not limited thereto. For another example, the insulating film IF may be formed by laminating insulating films for forming the insulating film IF on each of two surfaces of the substrate 200 on which the coil unit 300 is formed and then curing the same, or may be formed by applying an insulating paste for forming the insulating film IF on each of two surfaces of the substrate 200 on which the coil unit 300 is formed and then curing the same. Meanwhile, for the above-described reasons, the insulating film IF may be omitted from this exemplary embodiment. That is, the insulating film IF may be omitted from this exemplary embodiment when the body 100 obtains sufficient electrical resistance from designed operation current and voltage of the coil component 1000 according to this exemplary embodiment.

The external electrodes 410 and 420 may be disposed on the body 100 while being spaced apart from each other, and connected to the coil unit 300. Referring to FIG. 2, the external electrodes 410 and 420 in this exemplary embodiment may include pad portions 412 and 422 disposed on the sixth surface 106 of the body 100 while being spaced apart from each other, and connection portions 411 and 421 disposed on the first and second surfaces 101 and 102 of the body 100.

In detail, the first external electrode 410 may include the first connection portion 411 disposed on the first surface 101 of the body 100 and in contact with the first lead-out portion 331 exposed to the first surface 101 of the body 100, and the first pad portion 412 extended from the first connection portion 411 to the sixth surface 106 of the body 100.

The second external electrode 420 may include the second connection portion 421 disposed on the second surface 102 of the body 100 and in contact with the second lead-out portion 332 exposed to the second surface 102 of the body 100, and the second pad portion 422 extended from the second connection portion 421 to the sixth surface 106 of the body 100.

The first and second pad portions 412 and 422 may be disposed on the sixth surface 106 of the body 100 while being spaced apart from each other. Referring to FIGS. 1 and 2, the first slit portion 510 described below may be formed in a region between the first and second pad portions 412 and 422 positioned on the sixth surface 106 of the body 100. In addition, the first and second pad portions 412 and 422 may be parallel to each other in the W direction, and the first slit portion 510 described below may also be parallel to the first and second pad portions 412 and 422.

The connection portions 411 and 421 and the pad portions 412 and 422 may be formed together in the same process and may be integrally formed with each other without having a boundary formed therebetween, and the scope of the present disclosure is not limited thereto.

The external electrodes 410 and 420 may be formed by the vapor deposition such as the sputtering and/or electroplating, and are not limited thereto.

The external electrodes 410 and 420 may be formed of a conductive material such as copper (Cu), aluminum (Al), silver (Ag), tin (Sn), gold (Au), nickel (Ni), lead (Pb), chromium (Cr), titanium (Ti) or an alloy thereof, and are not limited thereto.

The external electrodes 410 and 420 may each have a single-layer or multi-layer structure. For example, the external electrodes 410 and 420 may be disposed on a first conductive layer including copper (Cu), a second conductive layer disposed on the first conductive layer and including nickel (Ni), and a third conductive layer disposed on the second conductive layer and including tin (Sn). At least one of the second conductive layer and the third conductive layer may cover the first conductive layer, and the scope of the present disclosure is not limited thereto. At least one of the second conductive layer and the third conductive layer may be disposed only on the sixth surface of the body 100, and the scope of the present disclosure is not limited thereto. The first conductive layer may be a plating layer or a conductive resin layer formed by coating and curing a conductive resin including conductive powder particles including at least one of copper (Cu) and silver (Ag) and a resin. The second and third conductive layers may be the plating layers, and the scope of the present disclosure is not limited thereto.

The slit portions 510 and 520 may be formed in at least one of the sixth and fifth surfaces 106 and 105 of the body 100. The first slit portion 510 and the second slit portion 520 may respectively be formed in the sixth and fifth surfaces 106 and 105 of the body 100, or only one of the first slit portion 510 and the second slit portion 520 may be formed therein.

The slit portions 510 and 520 may reduce leakage current of the coil component 1000 according to this exemplary embodiment, flowing along the surface of the body 100. In detail, when a high voltage is applied to the smaller and low-file coil component 1000, the leakage current may occur in addition to the current flowing along each path of the first external electrode 410, coil unit 300 and second external electrode 420. The leakage current may have various paths. For example, the leakage current may flow from the first or second external electrode 410 or 420 to the coil unit 300 by passing through the inside of the body 100, flow along the surface of the body 100, between the first and second external electrodes 410 and 420 or flow between turns adjacent to the coil patterns 311 and 312.

The present disclosure aims to reduce the leakage current flowing along the surface of the body 100, between the first and second external electrodes 410 and 420, and may have the slit portion 510 or 520 formed in the path (i.e., leakage path) through which the leakage current flows along the surface of the body 100, and fill the slit portion with the insulating material to make the leakage path long, thereby reducing the leakage current.

The slit portions 510 and 520 may respectively be spaced apart from the first and second external electrodes 410 and 420, and may be formed in a direction (i.e., W direction) intersecting a direction (i.e., L direction) in which both ends of the coil unit 300 are respectively lead out. The slit portion 510 or 520 formed in the sixth or fifth surface 106 or 105 of the body 100 may be extended to have both ends respectively exposed to the third or fourth surface 103 or 104 of the body 100.

The slit portion 510 or 520 may be perpendicular to the L direction. In this case, a length of the slit portion from one end to the other end may the same as a distance of the body 100 between the third and the fourth surfaces 103 and 104. In addition, when necessary, the slit portion 510 or 520 may intersect the L direction at an angle of about 90 degrees or obliquely thereto. In this case, the length of the slit portion from one end to the other end may be greater than the distance of the body 100 between the third and the fourth surfaces 103 and 104.

The slit portion 510 or 520 may have a shape of a straight line parallel to the W direction, and may have predetermined width $W_s$ and depth $D_s$, based on a shape of a dicing blade for forming the slit portion 510 or 520 by cutting the surface of the body 100. An amount of the leakage current flowing along the surface of the body 100 may be changed based on the width $W_s$ and depth $D_s$ of the slit portion 510 or 520, and a defect rate of the leakage current may also be changed based thereon.

Here, referring to FIG. 2, the width $W_s$ of the slit portion 510 or 520 may have a maximum value of respective dimensions of a plurality of line segments connecting outermost boundary lines of the slit portion 510 or 520 shown in the cross-sectional image, opposing each other in the length (L) direction, and parallel to the length (L) direction, in which the cross-sectional image may be the image of the length-thickness (LT) cross section of the coil component 1000 based on its center in the width (W) direction, obtained using the optical microscope or the scanning electron microscope (SEM). Alternatively, the width $W_s$ of the slit portion 510 or 520 may have a minimum value of the respective dimensions of the plurality of line segments connecting the two outermost boundary lines of the slit portion 510 or 520 shown in the cross-sectional image, opposing each other in the length (L) direction, and parallel to the length (L) direction. Alternatively, the width $W_s$ of the slit portion 510 or 520 may have at least three arithmetic average values of the respective dimensions of the plurality of line segments connecting the two outermost boundary lines of the slit portion 510 or 520 shown in the cross-sectional image, opposing each other in the length (L) direction, and parallel to the length (L) direction. Here, the plurality of line segments parallel to the length (L) direction may be equally spaced from each other in the thickness (T) direction, and the scope of the present disclosure is not limited thereto. Other measurement methods and/or tools appreciated by one of ordinary skill in the art, even if not described in the present disclosure, may also be used.

Alternatively, the depth $D_s$ of the slit portion 510 or 520 may have a maximum value of respective dimensions of a plurality of line segments connecting an outermost boundary line of the slit portion 510 or 520 shown in the cross-sectional image, closest to a center of the coil component 1000 in the thickness (T) direction, and an imaginary boundary line forming the sixth or fifth surface 106 or 105 of the body 100, and parallel to the thickness (T) direction, in which the cross-sectional image may be the image of the length-thickness (LT) cross section of the coil component 1000 based on its center in the width (W) direction, obtained using the optical microscope or the scanning electron microscope (SEM). Alternatively, the depth $D_s$ of the slit portion 510 or 520 may have a minimum value of the respective dimensions of the plurality of line segments connecting the outermost boundary line of the slit portion 510 or 520 shown in the cross-sectional image, closest to the center of the coil component 1000 in the thickness (T) direction, and the imaginary boundary line forming the sixth or fifth surface 106 or 105 of the body 100, and parallel to the thickness (T) direction. Alternatively, the depth $D_s$ of the slit portion 510 or 520 may have at least three arithmetic average values of the respective dimensions of the plurality of line segments connecting the outermost boundary line of the slit portion 510 or 520 shown in the cross-sectional image, closest to the center of the coil component 1000 in the thickness (T) direction, and the imaginary boundary line forming the sixth or fifth surface 106 or 105 of the body 100, and parallel to the thickness (T) direction. Here, the plurality of line segments parallel to the thickness (T) direction may be equally spaced from each other in the length (L) direction, and the scope of the present disclosure is not limited thereto. Other measurement methods and/or tools appreciated by one of ordinary skill in the art, even if not described in the present disclosure, may also be used.

Referring to FIG. 2, in the coil component 1000 according to this exemplary embodiment, the width $W_s$ of the slit portion 510 or 520 may be less than or equal to 20.8% of a total length $L_c$ of the coil component 1000. Here, as described above, the width $W_s$ of the slit portion 510 or 520 may have a dimension of the slit portion in the first direction (or L direction), and the total length $L_c$ of the coil component 1000 may have a dimension of the coil component in the first direction (or L direction).

TABLE 1

| Defect rate of leakage current flowing along surface of body | | | | | |
|---|---|---|---|---|---|
| Width (Ws) | Ratio of | Depth (Ds) of slit | | | |
| of slit | Ws to Lc | 0 | 30 μm | 70 μm | 110 μm |
| 0 | — | 8.02% | — | — | — |
| 50 μm | 4.2% | — | 7.359% | 7.157% | 6.993% |
| 100 μm | 8.3% | — | 3.402% | 3.480% | 2.156% |
| 150 μm | 12.5% | — | 1.722% | 1.740% | 1.823% |
| 200 μm | 16.7% | — | 0.830% | 1.100% | 1.176% |
| 250 μm | 20.8% | — | 0.651% | 0.620% | 0.539% |
| 300 μm | 25.0% | — | 0.557% | 0.540% | 0.559% |

Table 1 shows experimental data on the defect rate of the leakage current, based on a change in the width and depth of the slit portion 510 or 520.

Figure 5:
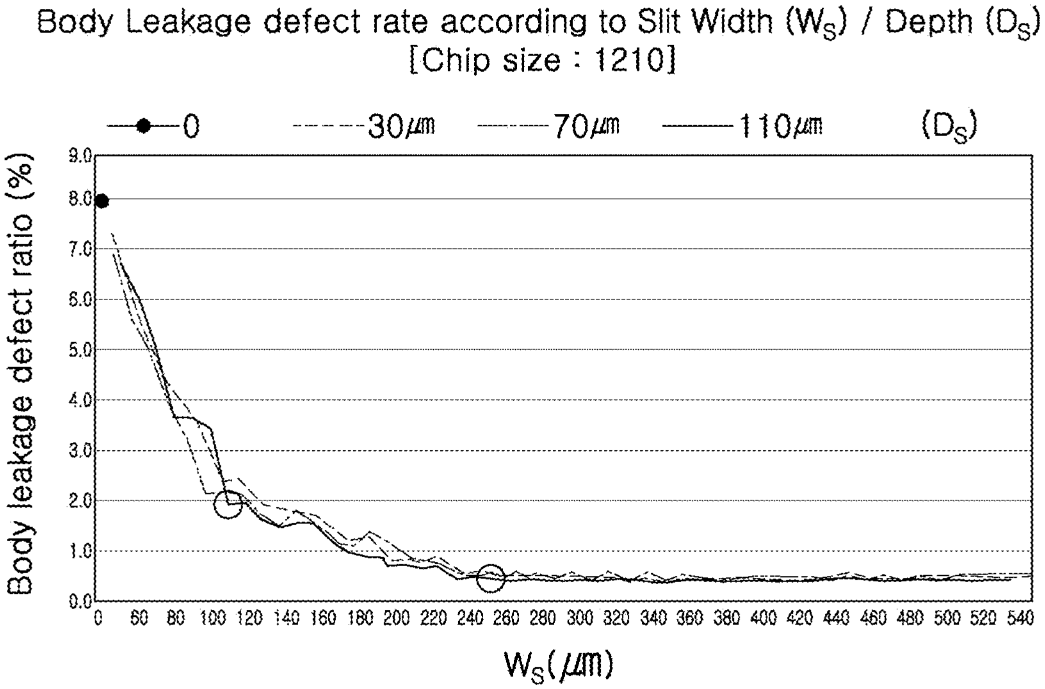
FIG. 5 is a graph illustrating a defect rate of leakage current, based on a change in the width and depth of a slit portion.

FIG. 5 is a graph illustrating the defect rate of the leakage current, based on the change in the width and depth of the slit portion 510 or 520.

Referring to Table 1 and FIG. 5, the defect rate of the leakage current flowing along the surface of the body 100 may depend on the width $W_s$ rather than the depth $D_s$ of the slit portion 510 or 520. The defect rate of the leakage current flowing along the surface of the body 100 may be reduced as the width $W_s$ of the slit portion 510 or 520 is increased, and the defect rate may not be reduced any more and become saturated near a point where the width $W_s$ of the slit portion 510 or 520 is 250 μm, i.e., near 20.8% of the total length $L_c$ of the coil component 1000, based on a chip having the coil component 1000 having a length of 1200 μm. However, a volume of the magnetic material in the body may be reduced as the width $W_s$ of the slit portion 510 or 520 is increased, and the characteristic of the coil component may thus be considered as well,

TABLE 2

| Defect rate of characteristic of component | | | | | |
|---|---|---|---|---|---|
| Width (Ws) | Ratio of | Depth (Ds) of slit | | | |
| of slit | Ws to Lc | 0 | 90 μm | 110 μm | 120 μm |
| 0 | — | 0 | — | — | — |
| 200 μm | 16.7% | — | 0 | 0 | 0 |
| 250 μm | 20.8% | — | 0 | 0 | 0.1% |
| 300 μm | 25.0% | — | 0 | 0.1% | 0.2% |
| 350 μm | 29.1% | — | 0.1% | 0.4% | 0.8% |
| 400 μm | 33.3% | — | 0.4% | 0.5% | 1.6% |
| 450 μm | 37.5% | — | 0.7% | 0.9% | 1.5% |

Table 2 shows experimental data on the defect rate of the characteristic of the coil component, based on a change in the width and depth of the slit portion 510 or 520.

Figure 6:
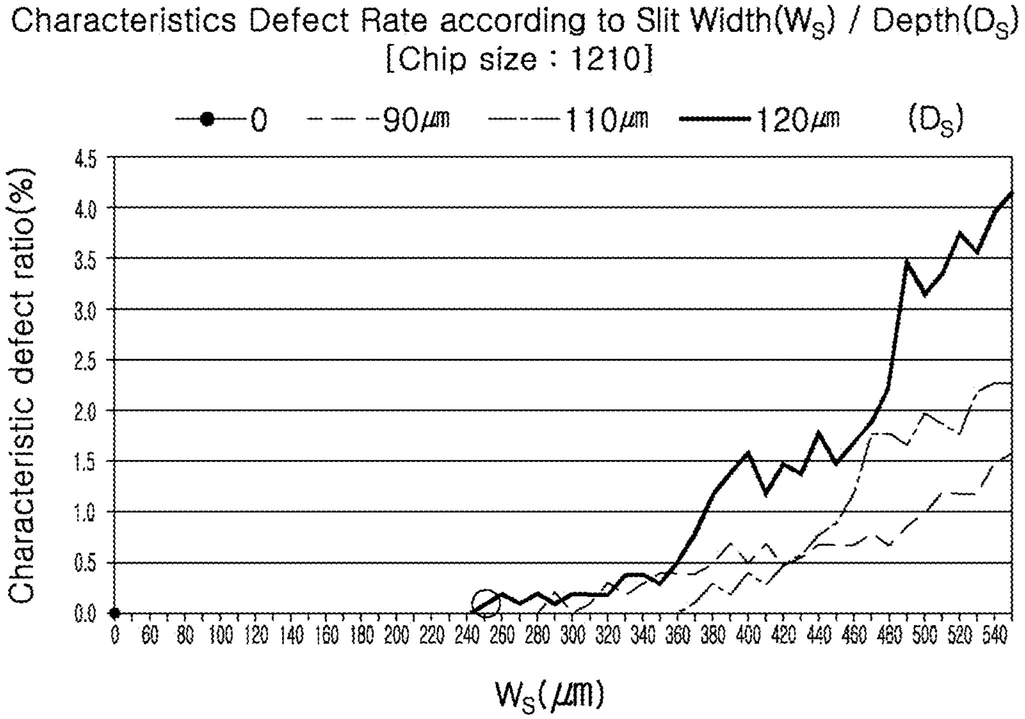
FIG. 6 is a graph illustrating a defect rate of a characteristic of the coil component, based on the change in the width and depth of the slit portion.

FIG. 6 is a graph illustrating the defect rate of the characteristic of the component, based on the change in the width and depth of the slit portion 510 or 520.

Referring to Table 2 and FIG. 6, an effective volume of the coil component 1000 may be reduced as the depth $D_s$ of the slit portion 510 or 520 is increased or the width $W_s$ of the slit portion 510 or 520 is increased, thus increasing the defect rate of the characteristic of the component. When the depth $D_s$ of the slit portion 510 or 520 is 120 μm, which is a limit value at which the coil unit is not exposed, it may be seen that the defect rate of the characteristic of the component starts to be increased near the point where the width $W_s$ of the slit portion 510 or 520 is 250 μm.

Therefore, the above experimental results may be summarized as follows: the width $W_s$ of the slit portion 510 or 520 may be less than or equal to 20.8% of the total length $L_c$ of the coil component 1000 in an effective range in which the defect rate of the leakage current flowing along the surface of the body of the coil component 1000 is reduced while the defect rate of the characteristic of the coil component is not increased.

In addition, referring to FIG. 5, when the width $W_s$ of the slit portion 510 or 520 is 100 μm, i.e., near 8.3% of the total length $L_c$ of the coil component 1000, the defect rate of the leakage current flowing along the surface of the body of the coil component 1000 may go down less than 2% and a slope of the graph may thus be significantly changed. Therefore, the width $W_s$ of the slit portion 510 or 520 may be 8.3% or more and 20.8% or less of the total length $L_c$ of the coil component 1000.

In addition, referring to FIG. 2, when the depth $D_s$ of the slit portion is greater than the predetermined depth, the coil unit may be exposed, and may thus be 75% or less of an average shortest distance $T_u$ between the second coil pattern 312 and the fifth surface 105 of the body 100.

The above average shortest distance $T_u$ between the second coil pattern 312 and the fifth surface 105 of the body 100 may have at least three arithmetic average values of respective dimensions of a plurality of line segments connecting an outermost boundary line of the second coil pattern 312 shown in the cross-sectional image and a boundary line of the fifth surface 105 of the body 100, and parallel to the thickness (T) direction, in which the cross-sectional image may be the image of the length-thickness (LT) cross section of the coil component 1000 based on its center in the width (W) direction, obtained using the optical microscope or the scanning electron microscope (SEM). Here, the plurality of line segments parallel to the thickness (T) direction may be equally spaced from each other in the length (L) direction, and the scope of the present disclosure is not limited thereto. Other measurement methods and/or tools appreciated by one of ordinary skill in the art, even if not described in the present disclosure, may also be used.

Referring to FIG. 2, an area of the slit portion 510 or 520 may be less than or equal to 5% of a total area of the coil component 1000, based on a length-thickness (LT) cross section of the coil component 1000 measured at its center in the width (W) direction. Here, the area of the slit portion 510 or 520 may have a value obtained by multiplying the width $W_s$ of the slit portion 510 or 520 by the depth $D_s$ of the slit portion 510 or 520. The total area of the coil component 1000 may have a value obtained by multiplying the above length $L_c$ of the coil component 1000 by a thickness $T_c$ of the coil component 1000.

Meanwhile, when only one of the first and second slit portions 510 and 520 are formed on the body 100, the area of one slit portion may be less than or equal to 5% of the total area of the coil component 1000. When both the first and second slit portions 510 and 520 are formed on the body 100, a sum of 5 respective areas of the first and second slit portions 510 and 520 may be less than or equal to 5% of the total area of the coil component 1000.

TABLE 3

| Volume reduction rate of coil component including slit | | Depth (Ds) of slit | | | |
|---|---|---|---|---|---|
| Width (Ws) of slit | Ratio of Ws to Lc | 0 | 90 μm | 110 μm | 120 μm |
| 0 | — | 0 | — | — | — |
| 200 μm | 16.7% | — | 0 | 0 | 0 |
| 250 μm | 20.8% | — | 0 | 0 | 0.1% |
| 300 μm | 25.0% | — | 0 | 0.1% | 0.2% |
| 350 μm | 29.1% | — | 0.1% | 0.4% | 0.8% |
| 400 μm | 33.3% | — | 0.4% | 0.5% | 1.6% |
| 450 μm | 37.5% | — | 0.7% | 0.9% | 1.5% |

Table 3 shows the experimental data on a volume reduction rate of the entire coil component 1000, based on a change in the width and depth of the slit portion 510 or 520.

Referring to Table 3 in comparison with Table 2, it may be seen that a point where the defect rate of the characteristic of the coil component starts to be increased is near a point where the volume reduction rate of the component is 58, and the volume of the slit portion 510 or 520 may be within 5% of the volume of the coil component 1000.

However, the dimension of the slit portion 510 or 520 from one end to the other end may be substantially the same as the dimension of the body 100 from the third surface 103 to the fourth surface 104, and the same effect may thus be obtained by forming the area of the slit portion 510 or 520 within 5% of the area of the coil component 1000, based on the length-thickness (LT) cross section of the coil component 1000 measured at its center in the width (W) direction.

At a level of a coil bar where the plurality of bodies 100 are continuously formed with each other, the slit portions 510 or 520 may be diced by the dicing blade to be formed in regions corresponding to the sixth surfaces 106 of the plurality of bodies 100. However, the scope of the present disclosure is not limited thereto.

Referring to FIGS. 2 and 3, the insulating material may fill the inside of the slit portion 510 or 520. The insulating material of the same composition as the external insulating layer 600 may fill the inside of the slit portion 510 or 520 in a process of printing the external insulating layer 600 described below on the sixth or fifth surface 106 or 105 of the body 100 after disposing the first and second external electrodes 410 and 420.

The process of filling the inside of the slit portion 510 or 520 and the process of printing the external insulating layer 600 may be performed as separate processes or as one process. When the two processes are performed as one process, the insulating material filling the inside of the slit portion 510 or 520 may be formed integrally with the external insulating layer 600, and is not limited thereto.

The insulating material filling the inside of the slit portions 510 and 520 may be filled by a method such as a printing method, the vapor deposition, a spray application method or a film lamination method, and is not limited thereto.

The insulating material filling the inside of the slit portion 510 or 520 may include a thermoplastic resin such as polystyrenes, vinyl acetates, polyesters, polyethylenes, polypropylenes, polyamides, rubbers or acryls, a thermosetting resin such as phenols, epoxies, urethanes, melamines or alkyds, a photosensitive resin, parylene, silicon oxide ($SiO_x$) or silicon nitride ($SiN_x$), may further include an insulation filler such as an inorganic filler, and is not limited thereto.

Referring to FIGS. 2 and 3, the coil component 1000 according to this exemplary embodiment may further include the external insulating layer 600 disposed in each of the third to fifth surfaces 103, 104 and 105 of the body 100 and the rest of the sixth surface except for a region where the first or second pad portion 412 or 422 is disposed.

The external insulating layer 600 may be extended from the fifth surface 105 of the body 100 to at least a portion of the first to fourth surfaces 101, 102, 103 and 104 of the body 100. In this exemplary embodiment, the external insulating layer 600 may be disposed in each of the third to fifth surfaces 103, 104 and 105 of the body 100 and the rest of the sixth surface except for the region where the first or second pad portion 412 or 422 is disposed, at least some of the external insulating layers 600 disposed in the third to fifth surfaces 103, 104 and 105 of the body 100 and the rest of the sixth surface except for the region where the first or second pad portion 412 or 422 is disposed may be formed in the same process and formed integrally with each other to have no boundary formed therebetween. However, the scope of the present disclosure is not limited thereto.

The external insulating layer 600 may be formed by forming the insulating material for forming the external insulating layer 600 by using the method such as the printing method, the vapor deposition, the spray application method or the film lamination method, and is not limited thereto.

The external insulating layer 600 may include the thermoplastic resin such as polystyrenes, vinyl acetates, polyesters, polyethylenes, polypropylenes, polyamides, rubbers or acryls, the thermosetting resin such as phenols, epoxies, urethanes, melamines or alkyds, the photosensitive resin, parylene, silicon oxide ($SiO_x$) or silicon nitride ($SiN_x$). The external insulating layer 600 may further include the insulation filler such as the inorganic filler, and is not limited thereto.

Second and Third Exemplary Embodiments

Figure 4A:
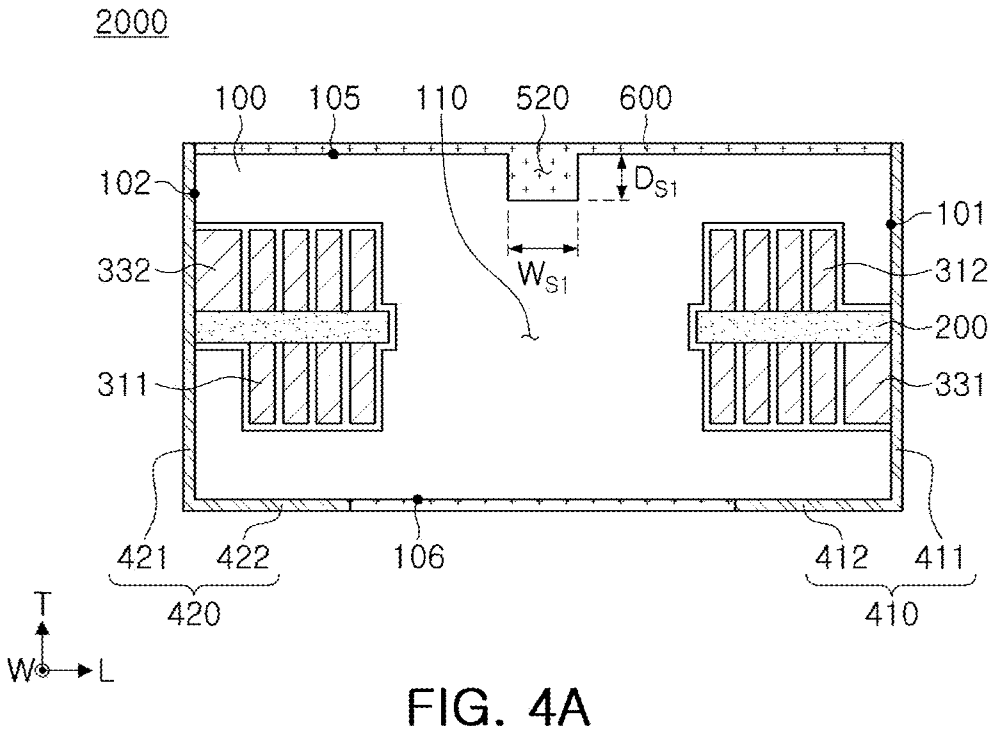
FIG. 4A is a view illustrating a coil component according to a second exemplary embodiment, and a view corresponding to FIG. 2.
Figure 4B:
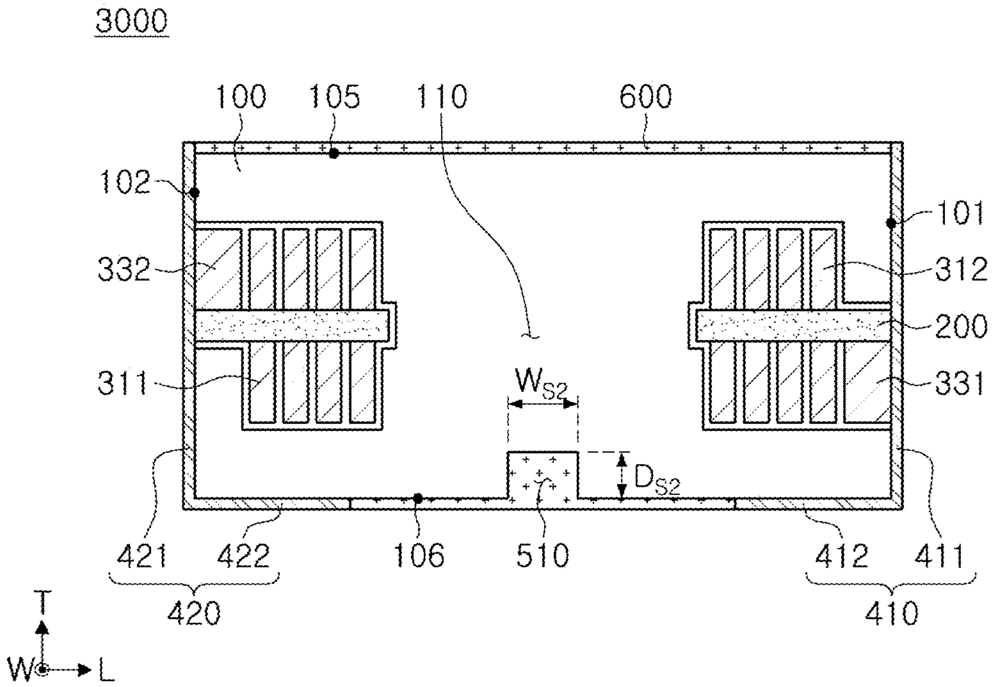
FIG. 4B is a view illustrating a coil component according to a third exemplary embodiment, and a view corresponding to FIG. 2.
Figure 4C:
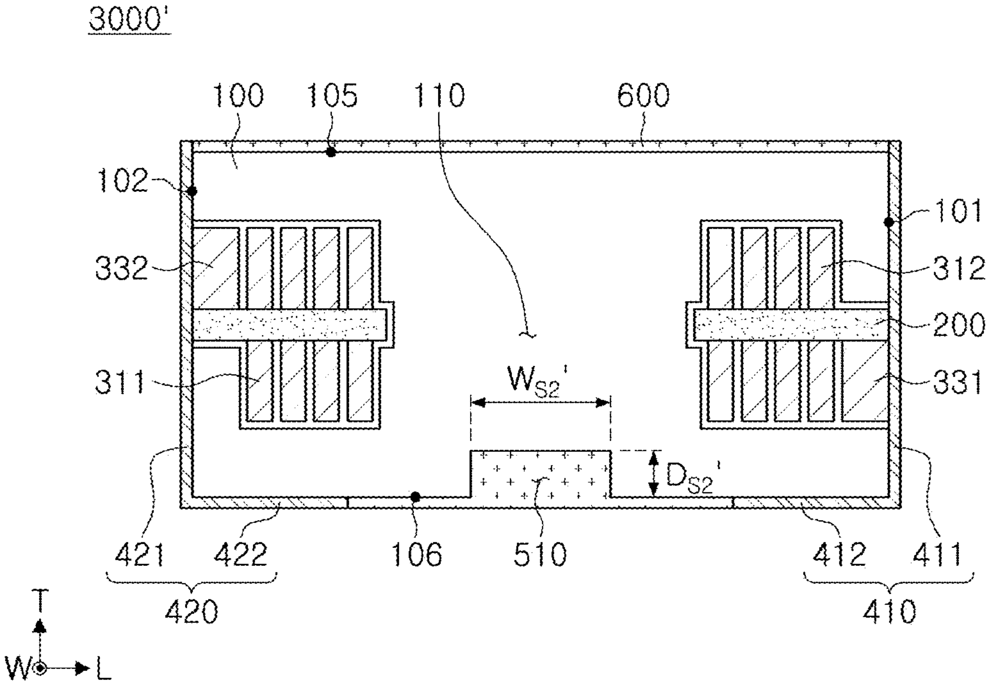
FIG. 4C is a view illustrating a coil component according to a modified example of the third exemplary embodiment, and a view corresponding to FIG. 2.

FIG. 4A is a view illustrating a coil component 2000 according to a second exemplary embodiment, and a view corresponding to FIG. 2; FIG. 4B is a view illustrating a coil component 3000 according to a third exemplary embodiment, and a view corresponding to FIG. 2; and FIG. 4C is a view illustrating a coil component 3000' according to a modified example of the third exemplary embodiment, and a view corresponding to FIG. 2.

Referring to FIG. 4A and FIG. 4B, the coil components 2000 and 3000 according to the second and third exemplary embodiments of the present disclosure may have the different number of the slit portion 510 or 520 when compared with the coil component 1000 according to the first exemplary embodiment of the present disclosure. Therefore, in these exemplary embodiments, the description describes only the slit portion 510 or 520 different from that in the first exemplary embodiment of the present disclosure. For the other components of these exemplary embodiments, the description for those in the first exemplary embodiment of the present disclosure may be applied as it is.

Referring to FIG. 4A, the coil component 2000 according to the second exemplary embodiment may only include the slit portion 520 formed in the fifth surface 105 of the body 100 and may not include the slit portion 510 formed in the sixth surface 106 of the body 100. The width $W_{s1}$ and the depth $D_{s1}$ of the slit portion 520 may have values in the same range as those of the coil component 1000 in the first exemplary embodiment described above.

When the slit portions 510 and 520 are formed in the body 100, the leakage current flowing along the surface of the body 100 may be reduced. However, the magnetic material in the body 100 may be reduced as the volumes of the slit portions 510 and 520 are increased, thus reducing an effective volume rate of the coil component. When the effective volume rate is reduced, an inductance characteristic of the coil component may be reduced. Therefore, when the slit portion 520 is formed only in the fifth surface 105 of the body 100 as in this exemplary embodiment, the effective volume rate may be higher compared to the case where the slit portions 510 and 520 are respectively formed in the sixth and fifth surfaces 106 and 105, thus increasing the inductance characteristic of the coil component.

Referring to FIG. 4B, the coil component 3000 according to the third exemplary embodiment may only include the slit portion 510 formed in the sixth surface 106 of the body 100 and may not include the slit portion 520 formed in the fifth surface 105 of the body 100. The width $W_{s2}$ and the depth $D_{s2}$ of the slit portion 510 may have values in the same range as those of the coil component 1000 in the first exemplary embodiment described above.

When the slit portions 510 and 520 are formed in the body 100, the leakage current flowing along the surface of the body 100 may be reduced. However, the magnetic material in the body 100 may be reduced as the volumes of the slit portions 510 and 520 are increased, thus reducing the effective volume rate of the coil component. When the effective volume rate is reduced, the inductance characteristic of the coil component may be reduced. Therefore, when the slit portion 510 is formed only in the sixth surface 106 of the body 100 as in this exemplary embodiment, the effective volume rate may be higher compared to the case where the slit portions 510 and 520 are respectively formed in the sixth and fifth surfaces 106 and 105, thus increasing the inductance characteristic of the coil component.

In addition, when compared with the coil component 2000 according to the second exemplary embodiment, it may be more effective in reducing the leakage current flowing along the surface of the body 100 to form the slit portion 510 in the sixth surface 106, which has a close distance between the first and second external electrodes 410 and 420 as in the coil component 3000 according to this exemplary embodiment. In detail, when the slit portion 520 is formed in the fifth surface 105, a distance between the first and second external electrodes 410 and 420 may be the same as a distance between the first and second connection portions 411 and 421. On the other hand, when the slit portion 510 is formed in the sixth surface 106, the distance between the first and second external electrodes 410 and 420 may be the same as a distance between the first and second pad portions 412 and 422. Therefore, a probability in which the leakage current flows along the surface of the body may be higher on the sixth surface 106 where the distance between the first and second external electrodes 410 and 420 is close. It may thus be more effective in reducing the leakage current flowing along the surface of the body when the slit portion 510 is formed in the sixth surface 106 as in this exemplary embodiment.

Referring to FIG. 4C, the coil component 3000' according to this modified example may have a greater width $W_{s2'}$ of the slit portion 510 than the coil component 3000 according to the third exemplary embodiment. According to a test result of the defect rate of the leakage current flowing along the surface of the body, there is no significant change in the defect rate even though the depth $D_s$ of the slit portion 510 is changed. A depth $D_{s2'}$ of the slit portion 510 of the coil component 3000' according to this modified example may thus have the same value as the depth $D_{s2}$ of the slit portion 510 of the coil component 3000 according to the third exemplary embodiment.

When the slit portion 510 has the greater width $W_{s2'}$ like the coil component 3000' according to this modified example, the insulating material inside the slit portion 510, which blocks the leakage current flowing along the surface of the body, may have an increased volume and a longer path of the leakage current flowing along the surface of the body. Accordingly, the leakage current flowing along the surface of the body 100 may be reduced, thus reducing the defect rate of the leakage current flowing along the surface of the body.

Fourth and Fifth Exemplary Embodiments

Figure 7:
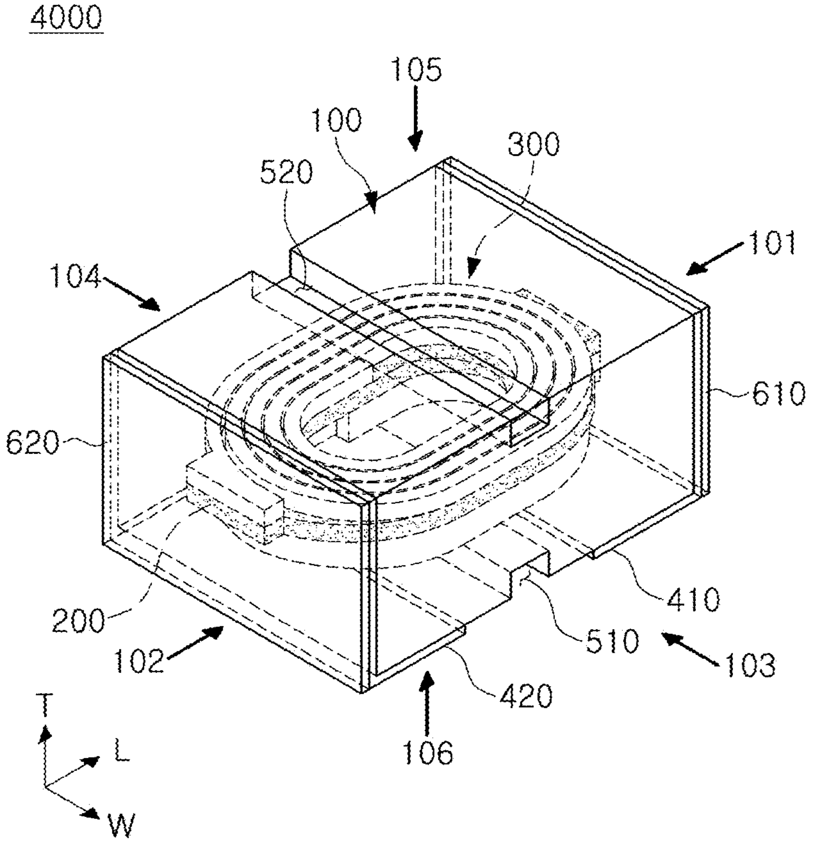
FIG. 7 is a perspective view schematically showing a coil component according to a fourth exemplary embodiment of the present disclosure.
Figure 8:
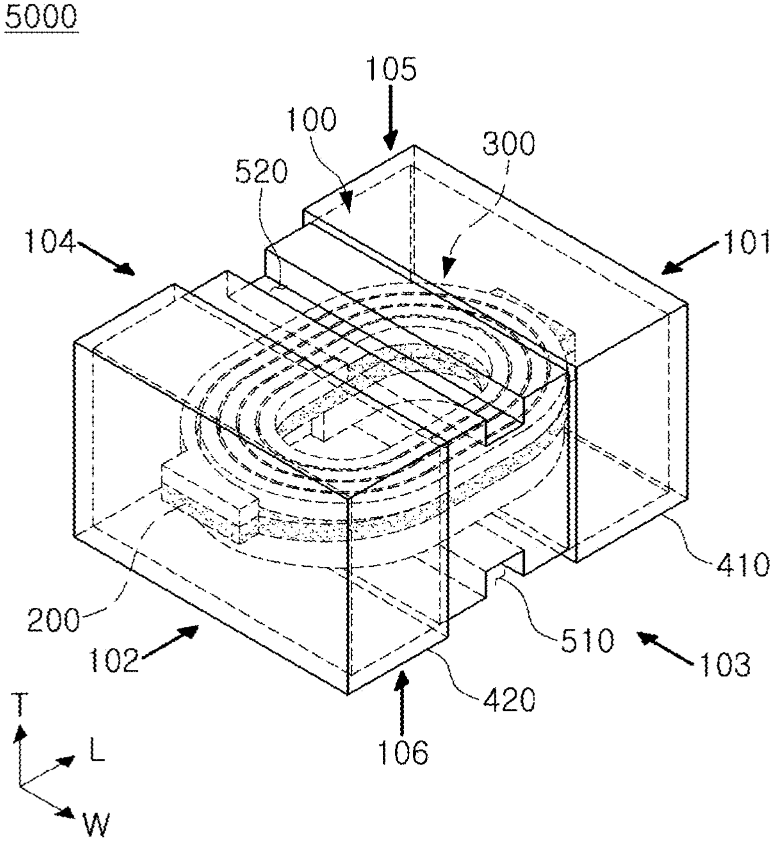
FIG. 8 is a perspective view schematically showing a coil component according to a fifth exemplary embodiment of the present disclosure.

FIG. 7 is a perspective view schematically showing a coil component 4000 according to a fourth exemplary embodiment of the present disclosure; and FIG. 8 is a perspective view schematically showing a coil component 5000 according to a fifth exemplary embodiment of the present disclosure.

Meanwhile, FIGS. 7 and 8 omit the external insulating layer 600 used in these exemplary embodiments in order to more clearly show the coupling between other components.

Referring to FIG. 7, the coil component 4000 according to the fourth exemplary embodiment of the present disclosure may be different from the coil component 1000 according to the first exemplary embodiment of the present disclosure in that first and second additional insulating layers 610 and 620 are respectively disposed on the first and second connection portions 411 and 421 of the first and second external electrodes 410 and 420, respectively disposed on the first and second surfaces 101 and 102 of the body 100. Therefore, in this exemplary embodiment, the description describes only the additional insulating layer 610 or 620 different from the first exemplary embodiment of the present disclosure. For the other components of this exemplary embodiment, the description for those in the first exemplary embodiment of the present disclosure may be applied as it is.

The coil component 4000 according to the fourth exemplary embodiment of the present disclosure may further include the additional insulating layers 610 and 620 respectively covering the first and second connection portions 411 and 421. In addition, although not shown, the external insulating layer 600 may be disposed on each of the third to fifth surfaces 103, 104 105 of the body 100, and the rest of the sixth surface except for the region where the first or second pad portion 412 or 422 is disposed. That is, the external insulating layer 600 or the additional insulating layers 610 and 620 may cover the rest of the sixth surface 106 of the body 100, except for the regions where the first and second pad portions 412 and 422 of the first and second external electrodes 410 and 420 are disposed while being spaced apart from each other. Accordingly, the coil component 4000 according to the fourth exemplary embodiment of the present disclosure may include the first and second external electrodes 410 and 420 respectively exposed only to the sixth surface 106 of the body 100.

A predetermined margin region in an outermost of the body may be formed also on the surface to which the first or second external electrode 410 or 420 is exposed by including the additional insulating layer 610 or 620. It is thus possible to prevent short-circuit between the coil component and another electronic component mounted adjacent to the coil component when the coil component 4000 according to this exemplary embodiment is mounted on a printed circuit board (PCB) or the like.

The additional insulating layer 610 or 620 may be formed by using the method such as the printing method, the vapor deposition, the spray application method or the film lamination method, and is not limited thereto.

The additional insulating layer 610 or 620 may include the thermoplastic resin such as polystyrenes, vinyl acetates, polyesters, polyethylenes, polypropylenes, polyamides, rubbers or acryls, the thermosetting resin such as phenols, epoxies, urethanes, melamines or alkyds, the photosensitive resin, parylene, silicon oxide ($SiO_x$) or silicon nitride ($SiN_x$). The additional insulating layer 610 or 620 may further include the insulation filler such as the inorganic filler, and is not limited thereto.

Referring to FIG. 8, the coil component 5000 according to the fifth exemplary embodiment of the present disclosure may have the different disposition and structure of the external electrode 410 or 420 when compared with the coil component 1000 according to the first exemplary embodiment of the present disclosure, Therefore, in this exemplary embodiment, the description describes only the external electrode 410 or 420 different from that of the first exemplary embodiment of the present disclosure. For the other components of this exemplary embodiment, the description for those in the first exemplary embodiment of the present disclosure may be applied as it is.

The first external electrode 410 may be disposed on the first surface 101 of the body 100, connected to the first lead-out portion 331 exposed to the first surface 101 of the body 100, and extended to four adjacent surfaces 103, 104, 105 and 106 to be disposed thereon.

The second external electrode 420 may be disposed on the second surface 102 of the body 100, connected to the second lead-out portion 332 exposed to the second surface 102 of the body 100, and extended to the four adjacent surfaces 103, 104, 105 and 106 to be disposed thereon.

The first and second external electrodes 410 and 420 of the coil component 5000 according to the fifth exemplary embodiment of the present disclosure may respectively be disposed on the third to sixth surfaces 103, 104, 105 and 106 of the body 100, while being spaced apart from each other. The coil component 5000 may thus have many regions where the first and second external electrodes 410 and 420 have a closer distance therebetween compared with the coil component 1000 according to the first exemplary embodiment. Therefore, the coil component 5000 may have a greater effect of blocking the leakage current flowing along the surface of the body by using the slit portion 510 or 520.

Sixth Exemplary Embodiment

Figure 9:
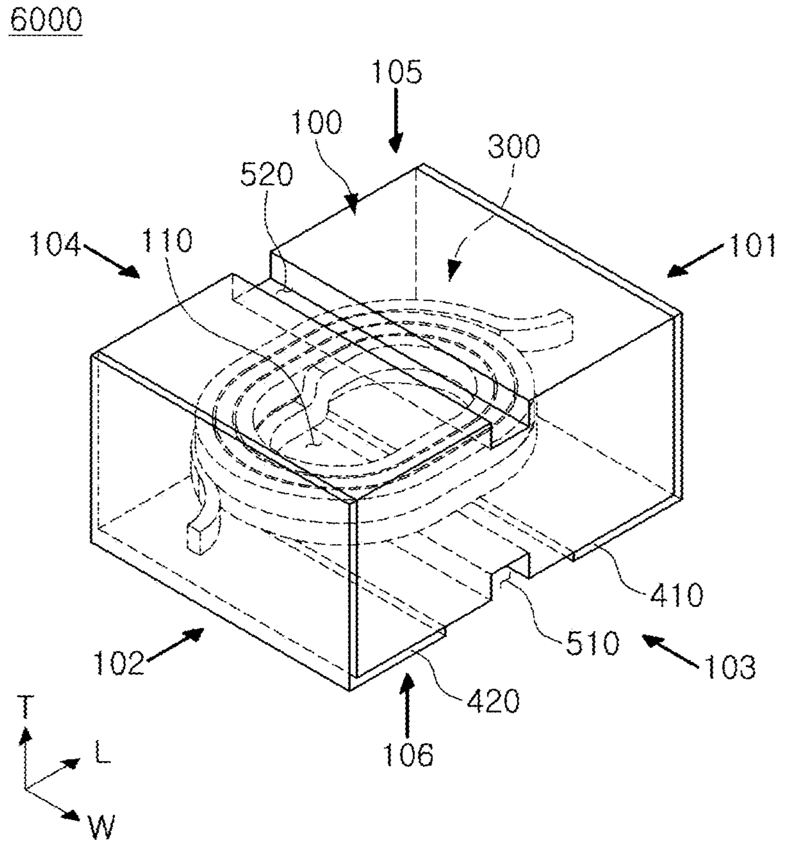
FIG. 9 is a perspective view schematically showing a coil component according to a sixth exemplary embodiment of the present disclosure.

FIG. 9 is a perspective view schematically showing a coil component 6000 according to a sixth exemplary embodiment of the present disclosure.

Referring to FIG. 9, the coil component 6000 according to the sixth exemplary embodiment of the present disclosure may be different from the coil component 1000 according to the first exemplary embodiment of the present disclosure in including a different configuration of the coil unit 300 and in not including the substrate 200. Therefore, in this exemplary embodiment, the description describes only the coil unit 300 different from that of the first exemplary embodiment of the present disclosure. For the other components of this exemplary embodiment, the description for those in the first exemplary embodiment of the present disclosure may be applied as it is.

The coil component 6000 according to this exemplary embodiment may include the wound-type coil unit 300. In this case, the coil component 6000 according to this exemplary embodiment may not include the substrate 200.

The coil unit 300 may be a wound coil formed by winding a metal wire such as a copper wire (Cu-wire) including the metal wire and a covering layer covering a surface of the metal wire. Accordingly, an entire surface of each of a plurality of turns of the coil unit 300 may be covered with the covering layer.

Meanwhile, the metal wire may be a flat wire, and is not limited thereto. When the coil unit 300 has the flat wire, the cross section of each turn of the coil unit 300 may have a rectangular shape. Meanwhile, FIG. 9 shows that the coil unit 300 is an alpha ($\alpha$) type wound coil. However, this type is only an example, and the coil unit 300 may be an edge-wise wound coil.

The covering layer may include the epoxy, the polyimide, the liquid crystal polymer (LCP) or the like, or the mixture thereof, and is not limited thereto.

As set forth above, according to the exemplary embodiments of the present disclosure, it is possible to reduce the leakage current flowing along the surface of the body even when the high voltage is applied to the smaller coil component.

While exemplary embodiments have been shown and described above, it will be apparent to those skilled in the art that modifications and variations could be made without departing from the scope of the present disclosure as defined by the appended claims.

What is claimed is:

1. A coil component comprising:

a body having a first surface and a second surface opposing each other, and a first end surface and a second end surface connecting the first surface and the second surface to each other and opposing each other in a first direction;

a coil unit disposed in the body;

first and second external electrodes disposed on the body while being spaced apart from each other, and each connected to the coil unit; and an external insulating layer covering the rest of the body except for a region where the first or second external electrode is disposed, wherein the coil component includes a slit portion formed in at least one of the first surface of the body and the second surface of the body, spaced apart from each of the first and second external electrodes, and extending in a direction intersecting the first direction, a dimension Ws of the slit portion in the first direction is less than or equal to 20.8% of a dimension Lc of the coil component in the first direction, a depth Ds of the slit portion is 75% or less of an average shortest distance Tu between the coil unit and the second surface of the body, and the slit portion includes a first slit portion formed in the first surface of the body and a second slit portion formed in the second surface of the body.

2. The coil component of claim 1, wherein the body further has a first side surface and a second side surface connecting the first end surface and the second end surface of the body to each other and opposing each other, and an area of the slit portion is less than or equal to 5% of a total area of the coil component, based on a cross section of the coil component parallel to the first side surface and the second side surface of the body.

3. The coil component of claim 1, wherein the dimension $W_s$ of the slit portion in the first direction is 8.3% or more and 20.8% or less of the dimension $L_c$ of the coil component in the first direction.

4. The coil component of claim 2, wherein the dimension $W_s$ of the slit portion in the first direction is 8.3% or more and 20.8% or less of the dimension $L_c$ of the coil component in the first direction.

5. The coil component of claim 1, wherein the body further has a first side surface and a second side surface connecting the first end surface and the second end surface of the body to each other and opposing each other, and a sum of respective areas of the first and second slit portions is less than or equal to 5% of a total area of the coil component, based on a cross section of the coil component parallel to the first side surface and the second side surface of the body.

6. The coil component of claim 1, wherein the slit portion extends to have both ends respectively exposed to a first side surface and a second side surface of the body connecting the first end surface and the second end surface of the body to each other and opposing each other.

7. The coil component of claim 6, wherein a dimension of the slit portion from one end to the other end is the same as a dimension of the body from one side to the other side.

8. The coil component of claim 1, wherein an insulating material is disposed in the slit portion.

9. The coil component of claim 8, wherein the external insulating layer includes the same material as the insulating material.

10. The coil component of claim 8, wherein the insulating material is formed integrally with the external insulating layer.

11. The coil component of claim 1, wherein the body further has a first side surface and a second side surface connecting all of the first surface, the second surface, the first end surface and the second end surface of the body to each other, and opposing each other, the first external electrode includes a first connection portion disposed on the first end surface of the body and connected to a first end of the coil unit, and a first pad portion extending from the first connection portion onto the first surface of the body, and the second external electrode includes a second connection portion disposed on the second end surface of the body and connected to a second end of the coil unit, and a second pad portion extending from the second connection portion onto the first surface of the body.

12. The coil component of claim 11, further comprising first and second additional insulating layers respectively covering the first and second connection portions.

13. The coil component of claim 12, wherein an entire region of the coil component is covered by the external insulating layer and the first and second additional insulating layers, except for the regions where the first and second pad portions of the first and second external electrodes are disposed.

14. The coil component of claim 1, wherein the body further has a first side surface and a second side surface connecting the first end surface and the second end surface of the body to each other, and opposing each other, the first external electrode is disposed on the first end surface of the body, connected to a first end of the coil unit, and extends onto the first surface, the second surface, the first side surface and the second side surface of the body, and the second external electrode is disposed on the second end surface of the body, connected to a second end of the coil unit, and extends onto the first surface, the second surface, the first side surface and the second side surface of the body.

15. The coil component of claim 1, further comprising a substrate disposed in the body, wherein the coil unit includes first and second coil patterns respectively disposed on opposite surfaces of the substrate, and a via passing through the substrate to connect respective inner ends of the first and second coil patterns to each other.

16. The coil component of claim 1, wherein the coil unit is a wound coil.

* * * * *